United States Patent [19]
Irwin et al.

[11] Patent Number: 5,801,314
[45] Date of Patent: *Sep. 1, 1998

[54] BRIDGE MOVEMENT DETECTOR

[75] Inventors: John R. Irwin, Riverdale, Utah; Shane F. Stoddard, 3920 S. 1915 West, Roy, Utah 84067

[73] Assignee: Shane F. Stoddard, Roy, Utah

[*] Notice: The terminal 15 months of this patent has been disclaimed.

[21] Appl. No.: 226,277

[22] Filed: Apr. 11, 1994

[51] Int. Cl.⁶ ............................................. G01M 5/00
[52] U.S. Cl. ................................... 73/786; 73/12.14
[58] Field of Search ........................... 73/12.01, 12.04, 73/12.12, 786, 594; 178/18, 19

[56] References Cited

U.S. PATENT DOCUMENTS

| | | |
|---|---|---|
| 2,770,126 | 11/1956 | Brown ............................. 73/12.04 |
| 4,617,515 | 10/1986 | Taguchi et al. ...................... 178/19 |
| 4,868,351 | 9/1989 | Watanabe et al. ..................... 178/19 |
| 5,028,745 | 7/1991 | Yanamani et al. ..................... 178/19 |
| 5,160,813 | 11/1992 | Watson .............................. 178/19 |
| 5,164,901 | 11/1992 | Blackburn et al. ............... 364/424.05 |

Primary Examiner—Ronald L. Biegel

[57] ABSTRACT

A damage detection system for detecting impacts to static structures such as bridges and the like. The damage detection system comprises an impact sensor assembly and impact analyzer system. The impact sensor assembly comprises a pendulum mounted for movement within the impact sensor assembly which is secured to a static structure. The impact analyzer system includes a micro-computer circuit, power means, visual indication means of the pendulum motion and relay circuit means to relay the type and magnitude of pendulum motion to a warning means.

11 Claims, 6 Drawing Sheets

BRIDGE MOVEMENT DETECTOR

BACKGROUND OF THE INVENTION

1. Field of the Invention

This invention relates to a damage detection system for detecting damage to bridges and the like caused by impacts from moving vehicles and the like thereto.

2. State of the Art

Catastrophic failures of static structures can occur when the structures have been damaged by impacts from vehicles and the like. For instance, bridges can suffer structural damage from impacts by trucks, barges, ships, earth movement etc., which may go unreported or undetected until the bridge catastrophically fails under loading from passing trains, trucks, and the like. The structural damage to a bridge may be in the form of either damage to a structural member or misalignment of the structural members or both. When such high impacts occur to bridges, it is desirable to detect such impacts and to warn the drivers of approaching vehicles of such impacts. For example, when a railroad bridge spanning a river has been impacted by a vessel on the river, it is very desirable to detect such an impact and warn approaching trains that the bridge has been impacted so that the bridge may be inspected for structural damage caused by such an impact before any failure of the bridge by excessive loading by a train using the bridge. For instance, a railroad bridge near Mobil Bay was struck by a barge which misaligned the bridge and a passenger train which, while attempting to pass over the bridge, derailed, plunging into Mobil Bay causing many passengers on the train to be killed or injured. In another instance a railroad bridge at Devil's Slide near Morgan, Utah was struck by a front end loader earthmoving vehicle which misaligned the bridge and a subsequent freight train passing over the bridge derailed causing extensive damage.

SUMMARY

The present invention relates to a damage detection system for detecting impacts to static structures such as bridges and the like. The damage detection system comprises an impact sensor assembly and impact analyzer system. The impact sensor assembly comprises a pendulum mounted for movement within the impact sensor assembly which is secured to a static structure. The impact analyzer system includes a micro-computer circuit, power means, visual indication means of the pendulum motion and relay circuit means to relay the type and magnitude of pendulum motion to a warning means.

The present invention will be better understood when the various drawing figures are taken in conjunction with the following detailed description of the invention.

DETAILED DESCRIPTION OF THE ILLUSTRATED EMBODIMENT

Figure 1:
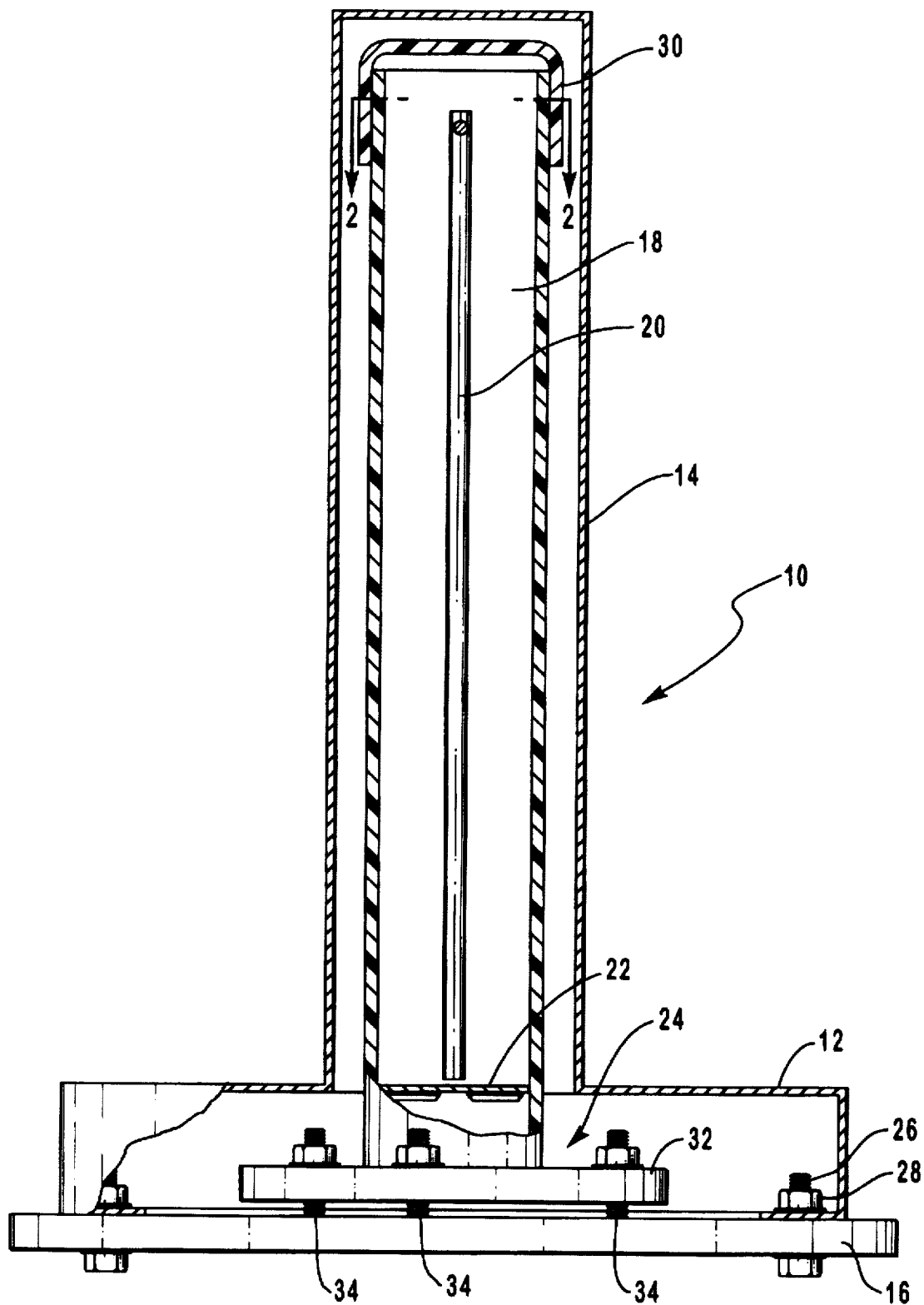
FIG. 1 is a cross-sectional view of the impact sensor assembly of the present invention.

Referring to drawing FIG. 1, a preferred embodiment of the impact sensor assembly 10 of the present invention is shown.

The impact sensor assembly 10 comprises a rectangular shaped lower housing 12, an upper housing 14, mounting member 16, pendulum support housing 18, pendulum 20, circuit board 22, and leveling assembly 24.

The rectangular shaped lower housing 12 may be formed of any suitable material, such as aluminum, steel, etc., and may be formed in an convenient shape sufficient to house and protect the lower portion of the impact sensor assembly 10. The rectangular shaped lower housing 12 is secured to mounting member 16 by means of suitable threaded fasteners 26, such as bolts, etc., having nuts 28, thereon.

The upper housing 14 may be formed of any suitable material, such as aluminum, steel, etc., and may have an desired cross-sectional shape, such as circular, rectangular, etc. so long as the pendulum support housing 18 fits conveniently and securely therein. The upper housing 14 may be secured to the lower rectangular shaped lower housing 12 by any suitable means, such as welding, threaded fastens, rivets, etc. As shown, the upper housing 14 is closed at the upper end by any suitable means, such as an integral formed cover, removable cap, etc.

The mounting member 16 may be of any suitable type of material, such as wood, aluminum, steel, etc., and formed in any suitable shape to support the various members of the impact sensor assembly 10.

The pendulum support housing 18 is typically formed of an elongated piece of elongated polyvinylchloride pipe for ease of fabrication, weight, being moisture repellant, cost, etc. The upper end of the pendulum support housing 18 is closed by a suitable cap 30, such as a polyvinylchloride cap. The cap 30 may be secured to the housing 18 by any suitable means, such as being threaded. The pendulum support housing 18 is secured to leveling platform 32.

The pendulum 20 is preferably formed as an elongated piece of a suitable annular metal tube of a predetermined suitable length. The pendulum 20 is supported from the upper end of the pendulum support housing 18.

The leveling assembly 24 comprises a leveling platform 32 supported from mounting member 16 my means of a plurality of threaded members 34. The threaded members 34 and their manner of engagement with leveling platform 32 may be typical of the leveling assemblies used in surveying transits.

Figure 2:
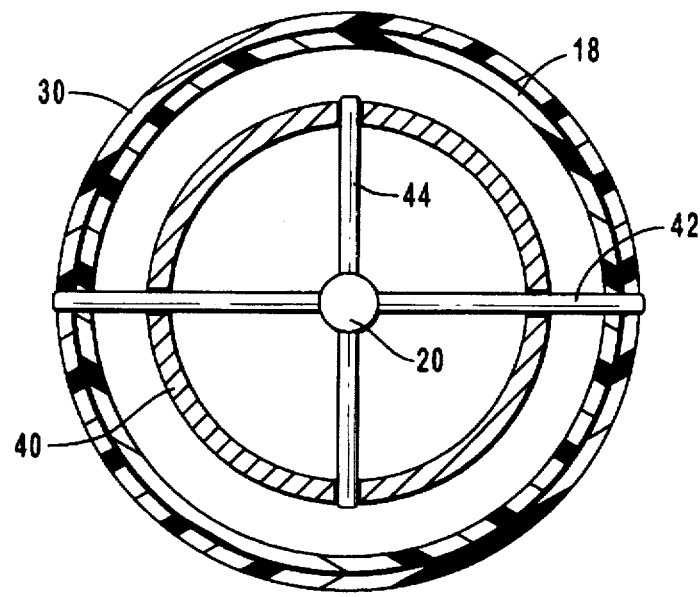
FIG. 2 is a top view of the gimbal assembly of the pendulum of the present invention.

Referring to drawing FIG. 2, the pendulum 20 is shown in top view as it is supported within pendulum support housing 18. As shown, annular circular member 40 is secured to pendulum support housing 18 by means of pin 42. The member 40 is free to pivot about the pin 42 within the housing 18. The pendulum 20 is supported from member 40 by means of pin 44 which is oriented at an angle of ninety degrees (90°) from pin 42. In this manner, the pendulum 20 has a gimbal mounting arrangement with respect to the pendulum support housing 18 to allow movement of the pendulum in two directions with respect to the housing 18.

Figure 3:
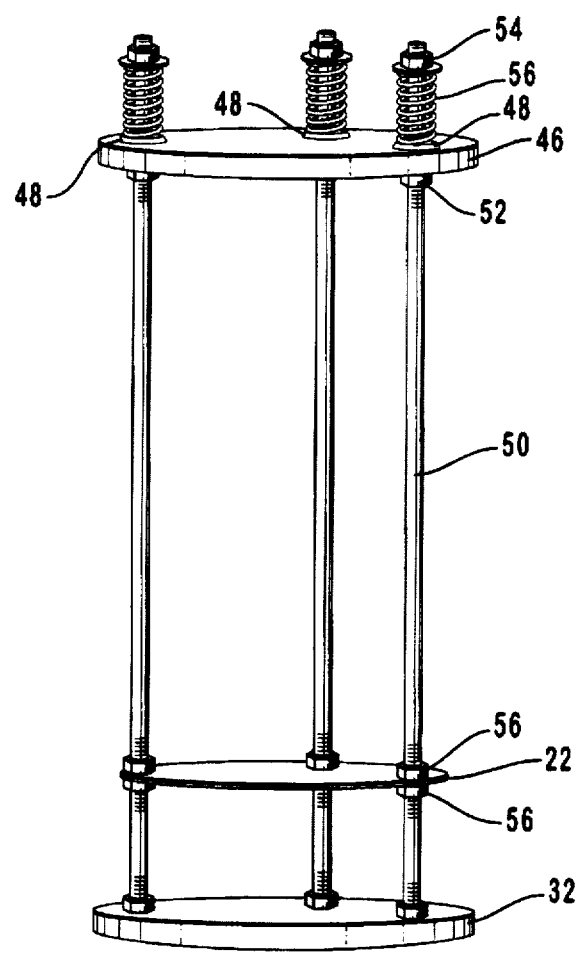
FIG. 3 is a schematic view of the mounting arrangement of the circuit board assembly of the present invention.

Referring to drawing FIG. 3, a portion of the pendulum support housing leveling assembly is shown. Mounted within the upper portion of the pendulum support housing 18 above the member 40 supporting the pendulum 20 is a circular support 46 which is secured within housing 18 by any suitable means and has a plurality of the apertures 48 therein, each aperture 48 located one hundred and twenty degrees (120°) circumferentially from the other in the support 46. Extending through each aperture 48 in an elongated rod 50 which is resiliently mounted and secured to support 46 via lower threaded fastener 52, upper threaded fastener 54 and spring 56 located between support 46 and upper threaded fastener 54. Retained on the lower portion of each rod 50 is circuit board 22 being retained on each rod 50 via threaded fasteners 56 so that the circuit board 22 is maintained in a predetermined relationship with respect to the lower end of the pendulum without being substantially affected by ambient temperature changes. The leveling platform 32 typically includes a plurality of three circumferential slots therethrough located generally evenly spaced about the periphery of the platform 32 so that the circumferential location of the end of each rod 50 may be adjusted as well as the vertical length of the rod 50 may be adjusted to level the pendulum support housing 18 as desired.

Figure 4:
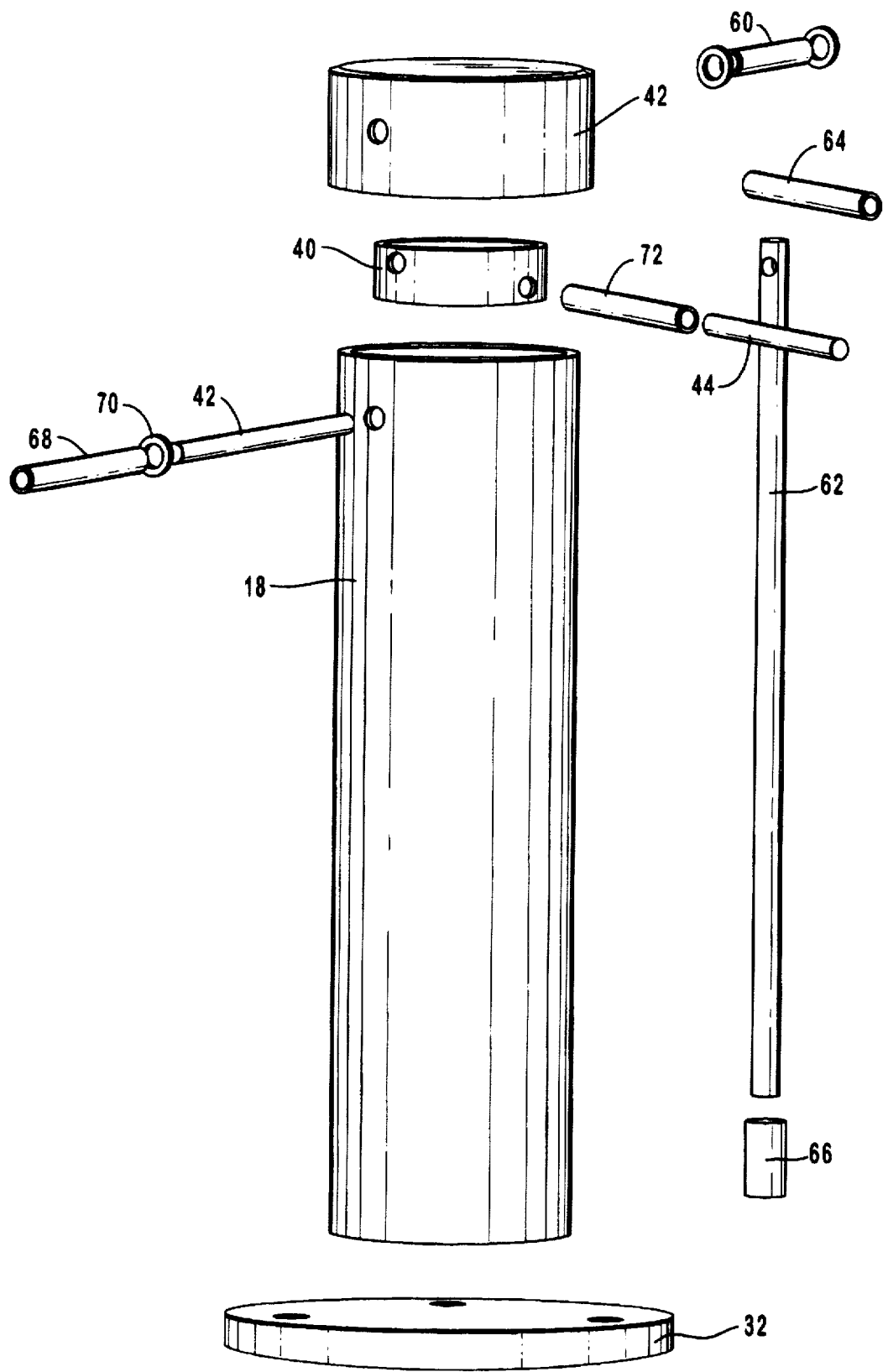
FIG. 4 is an exploded assembly view of a portion of the pendulum assembly.

Referring to drawing FIG. 4, the pendulum support housing 18 and some of the members mounted therein are shown. The pendulum 20 is mounted on pin 44 via brass sleeve 60 installed in apertures 62 of pendulum 20 while brass sleeves 64 extend on either side of pendulum 20 to the interior of member 40 and the ends of the pin 44 are secured to the exterior of the member 40 by a shaft collar 66 secured to each end of the pin 44. The member 40 is supported on pin 42 within the pendulum support housing 18 by outer brass sleeve 68 and washer 70 on each end of pin 42 extending between the interior of the housing 18 and exterior of member 40 and inner brass sleeve 72 located on pin 42 in the interior of member 40.

Figure 5:
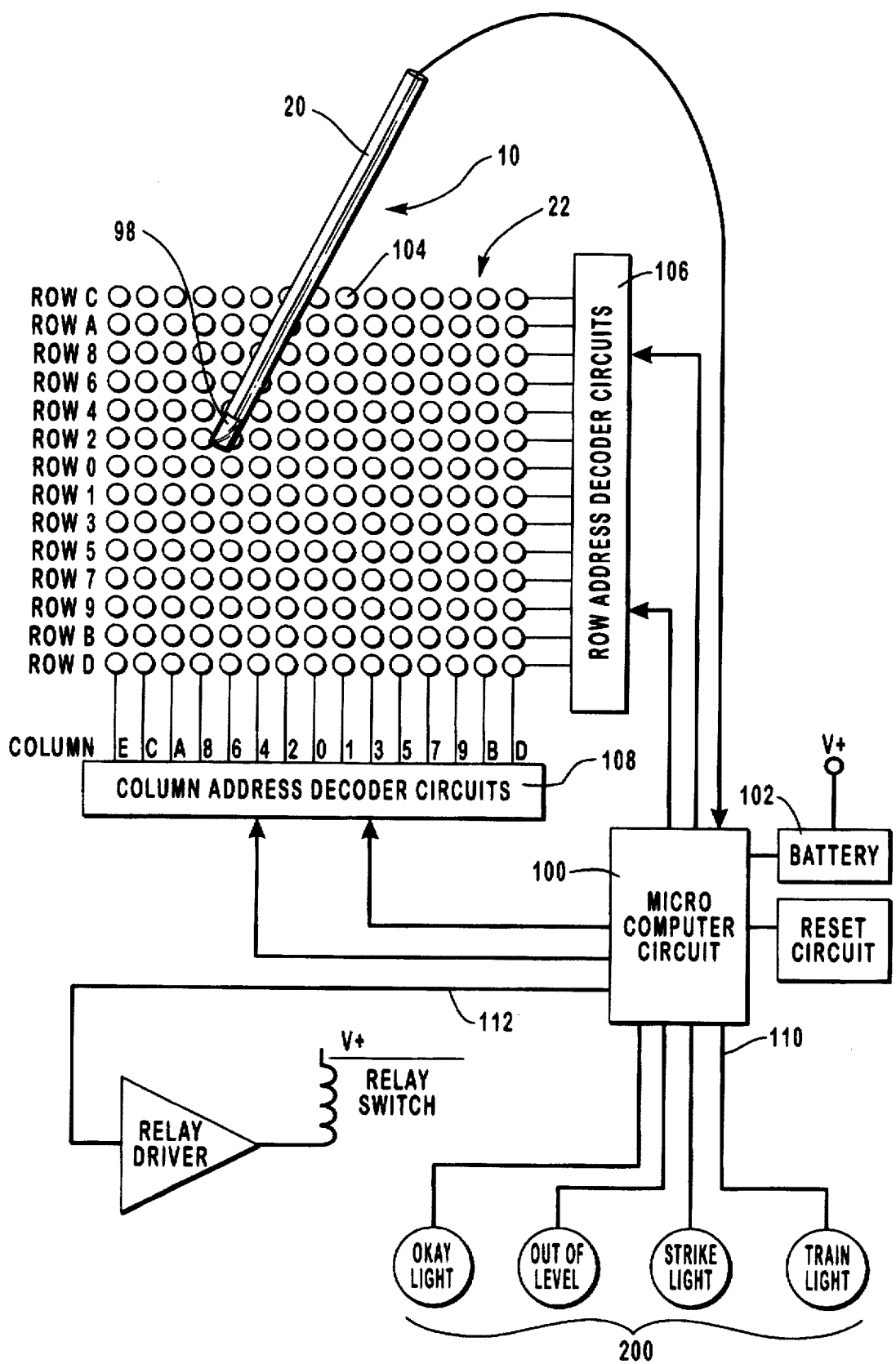
FIG. 5 is a schematic view of the electrical circuit of the present invention.

Referring to drawing FIG. 5, the circuit board 22, pendulum 20, and electrical circuits and computer system are shown in general schematic form. Installed in the lower end of the pendulum is a suitable photo-optical transistor 98 which is capable of sensing light and is, in turn, connected to the micro-computer circuit 100 which is, in turn, powered by a suitable battery 102 or other type of power source. The circuit board 22 comprises an array of a plurality of light sources 104 which are arranged in rows and columns, each light source being uniquely identified by an address generated by a suitable row address decoder circuit 106 and suitable column address decoder circuit 108 which are, in turn, connected to the micro-computer circuit 100. The micro-computer circuit 100 has various outputs therefrom, such as visual indicators 110 and relay circuit 112. The micro-computer circuit functions to illuminate one (1) light source 104 in sequence throughout the array of a plurality of light sources so that at any one time only one (1) source is illuminated. When the pendulum 20 is located over an illuminated light source 104, the photo-optical transistor 98 senses the illuminated light source 104 and sends a signal to micro-computer circuit 100 which, in turn, determines the location of the pendulum 20 via row address decoder circuits 106 and column address decoder circuits 108. A generally preferred manner in which the light sources 104 are illuminated is to begin at Row 0 and Column 0 and to illuminate light sources therefrom in a general circular spiral pattern extending outwardly therefrom.

The specific components of the micro-computer circuit 100, row address decoder circuits 106 and column address decoder circuits 108 have not been described in detail as they are readily fabricated in a variety of suitable manners and designs from a variety of commercially available components.

Figure 6:
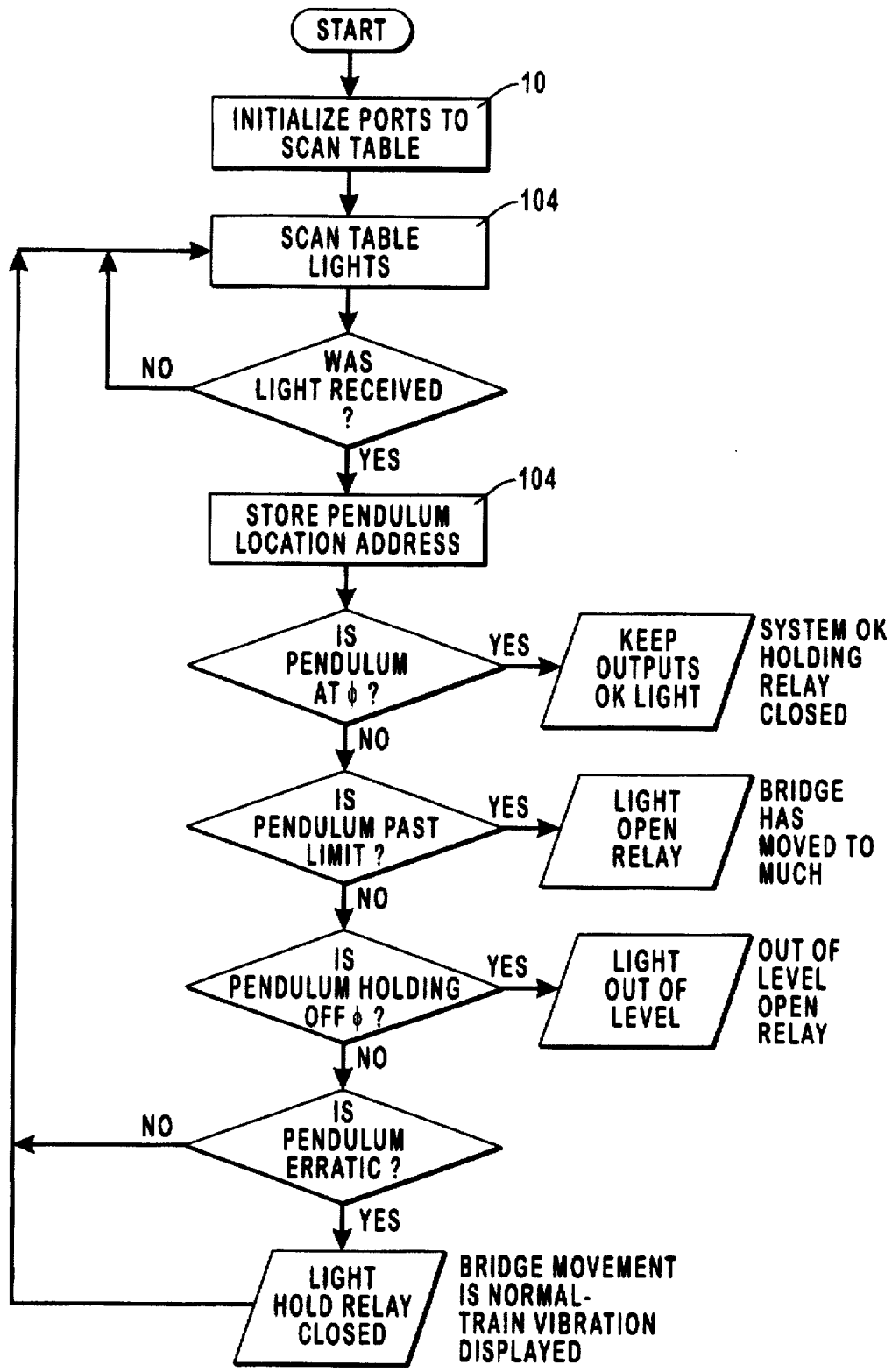
FIG. 6 is a flow chart of the software used in the present invention used to detect an impact which may cause structural damage to a static structure.

Referring to drawing FIG. 6, the general flowchart diagram of the microcomputer circuit is shown. Prior to activating the impact analyzer system 200, a predetermined value of the maximum acceptable range of movement or displacement of the pendulum 20 with respect to the array of light sources 104 is input into the micro-computer circuit. This predetermined value reflects maximum pendulum movement from a sudden impact to a bridge or static structure being damaged by such sudden impact.

When the impact sensor assembly 10 is level on a static structure, such as a bridge, and the bridge is not being impacted by traffic thereacross, such as a train, or by being struck by a vehicle or vessel, the pendulum 20 should be stable and located over the light source 104 having an address of Row 0, Column 0.

To start the software process, the various parts of the circuit board 22 and micro-computer circuit 100 are initialized to scan the array of a plurality of light sources 104 on the circuit board 22 located below the pendulum 20. The plurality of light sources 104 are illuminated in sequence as described hereinbefore starting at a Row 0, Column 0 location. If the pendulum 20 having photo-optical transistor 98 therein detects a light source 104, the transistor 98 signals the micro-computer circuit 100 which, in turn, knows the address of the light source 104 which has been illuminated. The micro-computer 100 stores the address of the pendulum 20.

At this point, the address of the pendulum 20 is analyzed to determine if it is at the Row 0, Column 0 location indicating a stable level operating condition of the pendulum which, if present, causes the array of light sources to be scanned again, or, alternatively, if the pendulum has moved an amount exceeding a predetermined limit input into the micro-computer circuit. If the pendulum has moved beyond a predetermined limit, a visual indication 110 is made and the relay circuit 112 activated to relay the information as such movement beyond a predetermined limit would possibly indicate the bridge or static structure had been struck by a vehicle or vessel and been damaged or moved from its footings thereby being unstable for use.

Alternatively, if the pendulum location is not Row 0, Column 0 or exceeded a predetermined limit, the software determines if the pendulum is resting or holding steady at a location other than Row 0, Column 0 thereby indicating an out-of-level condition for the impact sensor assembly 10. If the pendulum is resting or holding steady at a location other than Row 0, Column 0, a visual indicator 110 is displayed to convey such an out-of-level condition so that the pendulum may be returned to a level condition.

In the alternative, if the pendulum is not holding steady at a location other than Row 0, Column 0, the software determines if the pendulum is acting erratically by moving in a pattern that is not a stable swinging motion but, rather, jumps from one light source 104 location to another light source location 104 in the array of light sources 104 forming the circuit board. If the pendulum is not moving erratically, the array of light sources 104 are again scanned.

Alternatively, if it is determined the pendulum is acting erratically, a visual indication 110 is made signifying the bridge movement is normal for a train passing thereover and the array of light sources 104 are again scanned.

In general, the analysis of the forced vibrations that the impact sensor assembly 10 detects and relays to the impact analysis system 200 comprises distinguishing between damped sinusoidal vibrations which are induced by sudden impact loading and random vibrations superimposed on a sinusoidal wave as a train passes over the bridge, the random vibrations being caused by the passage of various types of railway vehicles having differing loads thereon. By setting a predetermined maximum value for pendulum movement with respect to the array of light sources, a predetermined amount of impact loading by the bridge being struck by a vehicle, vessel or object is determined as indicating a level of possible damage or misalignment to the bridge which may make the bridge unsafe for further traffic pending repair or inspection and repair. Depending upon the type or bridge, construction of the bridge, location of the damage detection system with respect to the bridge, the length of the pendulum in the damage detection system, etc., the maximum value input will vary.

Also, it may be desirable to incorporate an acoustic transducer or similar type device as an input to the microcomputer circuit to assist in determining the passage of a train over the bridge.

It should be noted that while the present invention has been described with respect to an array of light sources 104 on the circuit board 22 and photo-optical sensor on the pendulum 20 to sense an illuminated light source 104, other alternative means can be used.

Figure 7:
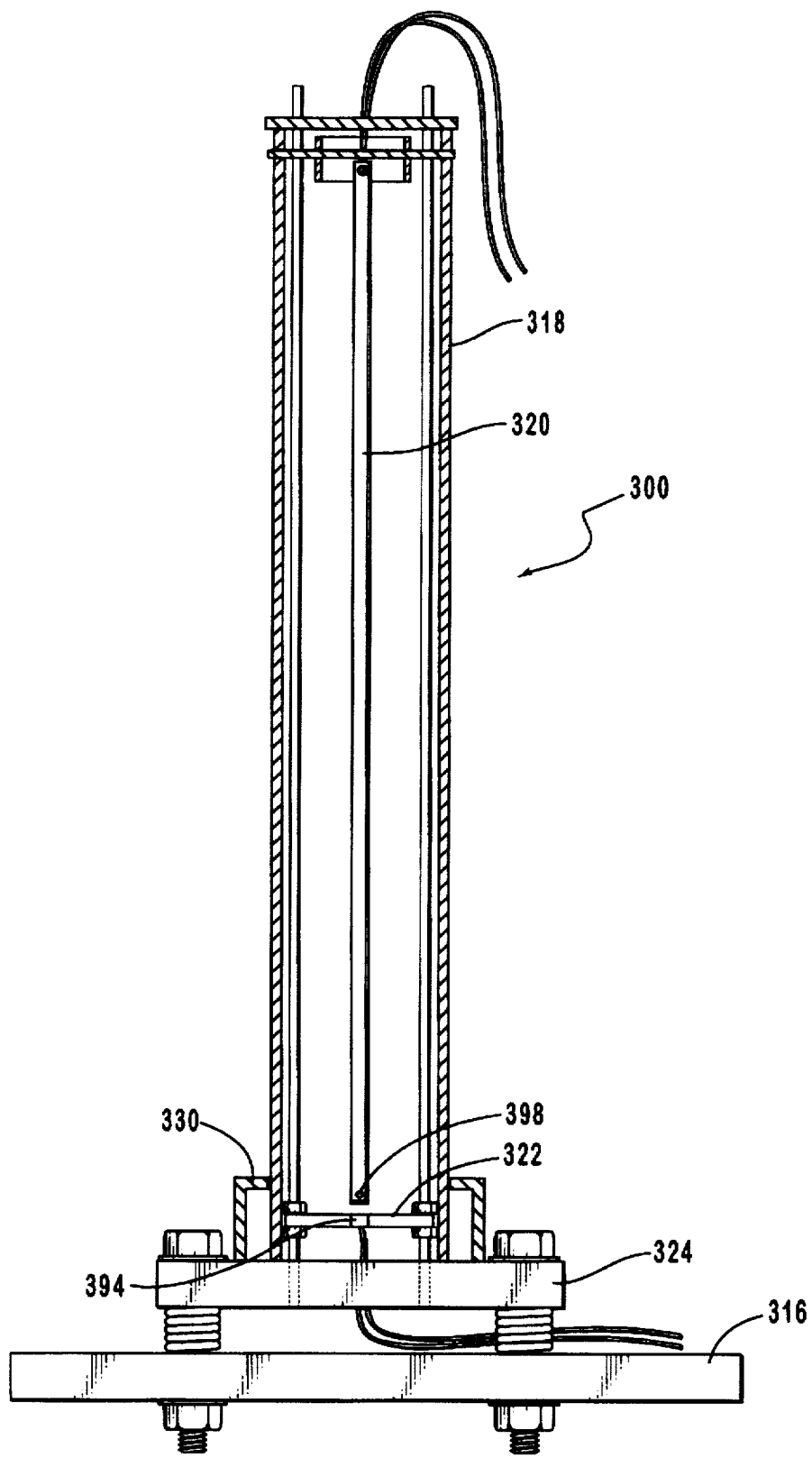
FIG. 7 is a cross-sectional view of an alternative embodiment of the present invention.

Referring to drawing FIG. 7, an alternative embodiment of impact sensor assembly 300 of the present invention is shown. The impact sensor assembly 300 comprises mounting member 316, pendulum support housing 318, pendulum 320, circuit board 322, leveling assembly 324, a red light emitting diode 398 located in the lower end of pendulum 320 and a photo cell 394 located in the circuit board 322. The operation and construction of the impact sensor assembly 300 is similar to that described hereinbefore with respect to the impact sensor assembly 10 except that the photo sensor 394 measures the passage of the red light emitting diode 398 thereover. In this manner, the impact analyzer system measures the frequency of the pendulum 320 rather than the amplitude. To enhance the operation of the impact sensor assembly 300 it may be necessary to provide damping rails 330 located on either side of the pendulum 320 to limit movement of the pendulum 320 with respect to the photo cell 394 to help eliminate circling of the pendulum 320 about the photo cell 394 under various types of vibratory impacts.

It should be noted that many differing types of motion detection apparatus and analysis apparatus and methods may be used to determine the frequency and amplitude of the pendulum from various impacts with bridge or static structure upon which impact sensor assembly is installed. It should also be noted that the damage detection system of the present invention can be adapted to various types of static structures where it is desired to determine when such structures have been subjected to impacts that may result in the structures being unsafe for use.

From the foregoing it can be easily seen that various changes, modifications, substitutions, deletions and the like can be made to the present invention which will fall within the scope thereof.

What is claimed is:

1. A damage detection system for detecting damage to static structures from impacts thereto, said damage system comprising:

an impact sensor assembly for mounting to a portion of said static structure, the impact sensor assembly including a pendulum mounted for movement therein and means for sensing the location of the pendulum in response to said impact to said static structure, the impact sensor including:

a pendulum housing having the pendulum mounted therein, a mounting member having the pendulum housing mounted thereon;

a leveling assembly for leveling the pendulum housing with respect to said static structure;

a gimbal mounting contained within the pendulum housing, the gimbal mounting having a portion thereof secured to the pendulum housing and having one end of the pendulum connected to another portion of the gimbal mounting to allow the pendulum to swing within the pendulum housing along two axis of motion; and an impact analyzer system for detecting the motion of the pendulum to determine if the motion exceeds a predetermined condition of pendulum motion beyond acceptable limits of predetermined conditions of pendulum motion, the impact analyzer system including a micro-computer circuit, power means providing power for said micro-power circuit, visual indication means for indicating types of pendulum motion and relay circuit means to transmit a signal indicative of the type and magnitude of the pendulum motion.

2. The system of claim 1 wherein the impact sensor assembly further includes:

a circuit board mounted below said pendulum at the lower end of the pendulum housing, the circuit board being connected to the micro-computer circuit and the power source.

3. The system of claim 2 wherein the impact sensor assembly further includes:

a plurality of elongated rods, each rod being resiliently mounted with respect to a portion of the pendulum housing and extending from a portion of one end thereof, the plurality of rods supporting the circuit board mounted below the pendulum housing to maintain the circuit board in a predetermined relationship with respect to the lower end of the pendulum without the relative position of the circuit board and the lower end of the pendulum being substantially affected by ambient temperature changes.

4. The system of claim 3 wherein the impact sensor assembly further includes:

an array of light sources arranged in a predetermined pattern in the circuit board, each light source being connected to the micro-computer circuit and being illuminated by the micro-computer circuit in a predetermined order of illumination; and photo-optical sensor means being located on the lower end of the pendulum for sensing light from a light source when the light source is illuminated when the pendulum is located thereabove, the photo-optical sensor means being connected to the micro-computer circuit.

5. The system of claim 3 wherein the impact sensor assembly further includes:

a light emitting diode installed in the lower end of the pendulum; and a photo cell sensor means for sensing when the pendulum passes thereover, the photo cell sensor means being connected to the micro-computer circuit.

6. A method of detecting impacts to a static structure, said method comprising the steps of:

installing an impact sensor assembly on said static structure, the impact sensor assembly including a pendulum mounted for movement therein;.

connecting the impact sensor assembly to an impact analyzer system for analyzing the motion of the pendulum, the impact analyzer system including a micro-computer circuit therein for analyzing the motion of the pendulum;

inputting a predetermined value in the micro-computer circuit which causes visual indication of response if the motion of the pendulum has exceeded the predetermined value;

providing a visual indication if the predetermined value of the motion of the pendulum has not exceeded the predetermined value input into the micro-computer circuit;

illuminating the light sources in the array of light sources individually in sequence;

storing the location of each light source of the array of light sources in the micro-computer circuit; and determining when the photo-optical sensor in the pendulum has sensed an illuminated light source.

7. The method of claim 6 further comprising the steps of:

providing a visual indication if the impact sensor assembly installed on said static structure is out of level.

8. The method of claim 6 further comprising the steps of:

providing a photo-optical sensor the lower end of the pendulum; and providing an array of light sources located below the pendulum.

9. The method of claim 6 further comprising the step of:

providing a indication if the predetermined value of pendulum motion has been exceeded when compared to the motion of the pendulum from said impact to said static structure such as bridges and the like.

10. The method of claim 6 further comprising the step of:

relaying the indication that the predetermined value of pendulum motion has been exceeded when compared to the motion of the pendulum form said impact to said static structure such as bridges and the like to another location through the use of a relay circuit connected to the micro-computer circuit.

11. The system of claim 1 wherein the impact sensor assembly further includes:

a relay circuit to relay the type and magnitude of pendulum motion to another location, the relay circuit connected to the micro-computer circuit.

* * * * *